US012050478B2

United States Patent
Pfeiffer (10) Patent No.: US 12,050,478 B2
(45) Date of Patent: Jul. 30, 2024

(54) CONVEYOR ASSEMBLY WITH TWO CONVEYOR ELEMENTS CONNECTED IN PARALLEL

(71) Applicant: Siemens Aktiengesellschaft, Munich (DE)

(72) Inventor: Bernd-Markus Pfeiffer, Uttenreuth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/629,474

(22) PCT Filed: Jul. 25, 2019

(86) PCT No.: PCT/EP2019/070076
§ 371 (c)(1),
(2) Date: Jan. 24, 2022

(87) PCT Pub. No.: WO2021/013355
PCT Pub. Date: Jan. 28, 2021

(65) Prior Publication Data
US 2022/0317710 A1 Oct. 6, 2022

(51) Int. Cl.
*G05D 7/06* (2006.01)
*G05B 19/416* (2006.01)

(52) U.S. Cl.
CPC ......... *G05D 7/0682* (2013.01); *G05B 19/416* (2013.01); *G05B 2219/37371* (2013.01)

(58) Field of Classification Search
CPC .............. G05D 7/0682; G05B 19/416; G05B 2219/37371
See application file for complete search history.

(56) References Cited

U.S. PATENT DOCUMENTS

2004/0099653 A1\* 5/2004 Hirayama .............. H05B 1/023
219/483
2009/0293988 A1\* 12/2009 Pang ........................ F17C 5/06
141/59
(Continued)

FOREIGN PATENT DOCUMENTS

| CN | 106257012 | 12/2016 |
| CN | 109642745 | 4/2019 |

(Continued)

OTHER PUBLICATIONS

Toshihiko Ono, "Steam temperature control method and steam temperature control device for boiler" (Application JP 2018-222749 Original/Machine Translation), Nov. 28, 2018, ip.com machine translation (Year: 2018).\*
(Continued)

*Primary Examiner* — Christopher W Carter
(74) *Attorney, Agent, or Firm* — Cozen O'Connor (57) ABSTRACT

A conveyor assembly for a medium, wherein the medium is conveyed from a source location to a destination via a conveyor line, where the conveyor line includes a conveyor section arranged between the source location and the destination and the conveyor section is equipped with two conveyor elements that are connected in parallel to each other and that are controlled by a respective flow controller, where the same flow target value and the same flow actual value are fed to both flow controllers, and the flow controllers ascertain a respective correcting variable for each conveyor element from said values, where a changeover device of the conveyor assembly prevents actuation of one conveyor element by one flow controller and releases the actuation of the other conveyor element by the other flow controller if the flow target value is above or below upper and lower changeover thresholds.

3 Claims, 4 Drawing Sheets

(56) References Cited

U.S. PATENT DOCUMENTS

| | | | |
|---|---|---|---|
| 2012/0111412 A1* | 5/2012 | Satake | H01L 21/67253 |
| | | | 137/561 R |
| 2016/0369717 A1 | 12/2016 | Brinkmann et al. | |
| 2018/0046206 A1* | 2/2018 | Nguyen | H01J 37/3244 |
| 2019/0178524 A1 | 6/2019 | Spreitzer | |
| 2019/0243391 A1* | 8/2019 | Hirata | H01L 21/67017 |
| 2021/0116075 A1* | 4/2021 | Lauvdal | E21B 41/0007 |

FOREIGN PATENT DOCUMENTS

| | | |
|---|---|---|
| DE | 4016016 | 11/1991 |
| DE | 102013001921 | 8/2014 |
| EP | 1081570 | 3/2001 |
| JP | 2001175336 | 6/2001 |
| JP | 2002-360028 | 12/2002 |

OTHER PUBLICATIONS

Yasuhiro Matsuoka, "Valve control method" (Application JP 2001-175336 Original/Machine Translation), Jun. 29, 2001, ip.com machine translation (Year: 2001).*

Kurt Breckner, "Circuit for process control and smooth process line changeover—contains ramp generator, multiplier and subtractor driving line control elements" (Application DE 4016016 Original/Machine translation), Nov. 21, 1991, ip.com machine translation (Year: 1991).*

International Search Report dated Mar. 23, 2020 based on PCT/EP2019/070076 filed Jul. 25, 2019.

* cited by examiner

CONVEYOR ASSEMBLY WITH TWO CONVEYOR ELEMENTS CONNECTED IN PARALLEL

CROSS-REFERENCE TO RELATED APPLICATION

This is a U.S. national stage of application No. PCT/EP2019/070076 filed 25 Jul. 2019.

BACKGROUND OF THE INVENTION

1. Field of the Invention

The present invention is based on a conveyor assembly for a medium, where the conveyor assembly includes a conveyor line via which the medium is conveyed from a source location to a destination, the conveyor line includes a conveyor section between the source location and the destination, a conveyor element is arranged in the conveyor section, the conveyor element is controlled by a flow controller, a target flow value and an actual flow value are supplied to the flow controller, and where the flow controller calculates a manipulated variable for the pump based on the target flow value and the actual flow value using a control algorithm.

2. Description of the Related Art

In many cases, it is necessary to convey a medium (i.e., a liquid) from a source location to a destination via a conveyor element. For example, it is necessary to transfer oil or water from a first tank to a second tank. In the case of a liquid medium, the conveyor element is a pump. For higher volume flows, the pump is generally formed as a centrifugal pump. In the case of a gaseous medium, the conveyor element is generally a compressor or a blower.

In some cases, the medium may be conveyed in an uncontrolled manner. However, it is often necessary to set a very specific medium flow rate, for example, 100 liters a second (where the numerical value should be understood as being purely exemplary).

For controlled conveying, in the simplest embodiment, the conveyor element is operated at a constant speed and, furthermore, a continuously adjustable resistor arranged upstream or downstream of the conveyor element in the conveyor line is set accordingly. In the case of a pump conveying a liquid medium, this can, for example, be an adjustable valve. Although this solution is simple, it is very inefficient in terms of energy. In particular, the conveyor element is permanently operated at full power to enable it to convey the maximum required flow rate. Furthermore, there are limits to this approach with respect to lower flow rates, because excessive throttling can result in turbulence in the flow and, moreover, if a valve is used, then cavitation can even occur in the valve gap. Cavitation leads to considerable wear.

An improved solution consists in operating the conveyor element at a variable speed. In this case, as mentioned above, the conveyor element is controlled by a flow controller, where a target flow value and an actual flow value are supplied to the flow controller and the flow controller calculates a manipulated variable for the conveyor element based on the target flow value and the actual flow value using a control algorithm. In this case, the conveyor element (to be more precise: the conveyor element's drive) is actuated by the flow controller according to the manipulated variable. The manipulated variable is a speed of the conveyor element or the drive thereof.

The latter approach is very efficient provided the flow rate must only be adjusted within relatively narrow limits. This is because, in this case, the conveyor element and the drive thereof can be optimized for the required flow rate, which is only required to be adjusted within relatively narrow limits. In this case, with liquid as the medium, the ratio between the maximum flow rate that occurs and the minimum flow rate that occurs should, for example, be at most 5:1, or even better only 4:1 or less, for example 2:1.

Although, if the aforementioned ratio is higher, for example 5:1 or more, operation of the conveyor element is still in principle possible (at least in some cases), then operation in this manner is energy-inefficient with relatively low flow rates, because both the conveyor element as such and the conveyor element's drive are designed for a specific speed and are much less efficient at significantly lower speeds. Furthermore, it is not generally possible to operate the conveyor element below a minimum flow rate.

SUMMARY OF THE INVENTION

It is an object of the present invention to provide the possibility on the basis of which, on the one hand, operation is in principle possible even with a high ratio between the maximum required flow rate and the minimum required flow rate and furthermore efficient operation of a correspondingly configured conveyor assembly is enabled.

This and other objects and advantages are achieved in accordance with the invention by a conveyor assembly for a medium, where the conveyor assembly includes a conveyor line via which the medium is conveyed from a source location to a destination, the conveyor line includes a conveyor section between the source location and the destination, two conveyor elements are arranged in the conveyor section, the conveyor elements are connected in parallel with one another and are controlled by a respective flow controller, a target flow value that is uniform for both flow controllers and an actual flow value that is uniform for both flow controllers are supplied to both flow controllers, and where the flow controllers calculate a respective manipulated variable for the respective conveyor element based on the target flow value and the actual flow value using a respective control algorithm, The conveyor assembly additionally includes a changeover device to which the target flow value is supplied, where the changeover device is configured such that, if the target flow value falls below a lower changeover threshold, then it suppresses the actuation of the one conveyor element by the one flow controller and releases the actuation of the other conveyor element by the other flow controller such that the medium flows solely via the other conveyor element as long as the target flow value remains above a minimum value and below an upper changeover threshold, and the changeover device is further configured such that, if the target flow value exceeds the upper changeover threshold, then it suppresses the actuation of the other conveyor element by the other flow controller and releases the actuation of the one conveyor element by the one flow controller so that the medium flows solely via the one conveyor element as long as the target flow value remains below a maximum value and above the lower changeover threshold.

Therefore, in accordance with the invention, two conveyor elements are connected in parallel with one another. In the case of pumps, the conveyor elements are generally formed as centrifugal pumps. In any case, however, the conveyor elements are dimensioned differently. The two conveyor elements are dimensioned differently. Consequently, one of the two conveyor elements can be referred to as a large conveyor element and the other conveyor element as a small conveyor element without restricting generality. Variable-speed drives are assigned to the conveyor elements as drives. The drives can, in particular, be converter-controlled electric drives. Each conveyor element is controlled by its own flow controller, where the respective flow controller can be parameterized in an optimized manner for actuation and operation of the respective conveyor element. However, the same target flow value and the same actual flow value are supplied to the two flow controllers. However, at any time, only one of the two conveyor elements is controlled in accordance with the manipulated variable of the associated flow controller. The respective other conveyor element is not actuated.

Let it be assumed that the large conveyor element is actuated at a certain point in time. This state is maintained until the target flow value falls below the lower changeover threshold. The falling below of the lower changeover threshold is monitored by the changeover device. If the target flow value falls below the lower changeover threshold, from this point in time, then the large conveyor element is no longer actuated in accordance with the manipulated variable of the flow controller assigned thereto, instead there is a changeover to the small conveyor element, such that the small conveyor element is actuated by the flow controller assigned thereto. This state is now retained until the target flow value exceeds the upper changeover threshold. The exceeding of the upper changeover threshold is also monitored by the changeover device. If the target flow value exceeds the upper changeover threshold, from this point in time, then the small conveyor element is no longer actuated in accordance with the manipulated variable of the flow controller assigned thereto, instead there is a changeover back to the large conveyor element, such that the large conveyor element is actuated in accordance with the manipulated variable of the flow controller assigned thereto.

It should be understood the lower changeover threshold must not be higher than the upper changeover threshold. However, the two changeover thresholds can have the same value. However, the upper changeover threshold is preferably higher than the lower changeover threshold. This achieves hysteresis behavior thus ensuring stabile operation of the conveyor assembly. In any case, however, the maximum value is higher than each of the two changeover thresholds and the minimum value is lower than each of the two changeover thresholds.

When there is a changeover from the one conveyor element to the other conveyor element, unstable conditions may occur for a short time. To achieve the most stable and smooth changeover possible, the flow controller with a non-actuated conveyor element is permanently tracked in each case. Therefore, a tracking value is supplied to the flow controller for which the actuation of the associated conveyor element is suppressed. The tracking value is obtained by multiplying the manipulated variable of the flow controller, which actuates its conveyor element, by a respective predetermined factor. The predetermined factor of the one conveyor element preferably corresponds to the quotient of the nominal flow rate of the other conveyor element divided by the nominal flow rate of the one conveyor element. Analogously, the predetermined factor for the other conveyor element preferably corresponds to the quotient of the nominal flow rate of the one conveyor element divided by the nominal flow rate of the other conveyor element. In any case, however, the two factors are reciprocal to one another. Therefore, if the one factor is designated f1 and the other factor f2: $f1*f2=1$.

To avoid overloads when the conveyor elements are started, a respective ramp generator is preferably assigned to the flow controllers. Calculated from the release of the actuation of the respective conveyor element by the respective flow controller, a speed of the respective conveyor element is ramped up in accordance with a predetermined respective ramp. This stabilizes the operating behavior of the conveyor assembly.

The two flow controllers are preferably coupled to one another so that they not only always receive the same target flow value and the same actual flow value, but are also always operated in the same operating mode. Possible operating modes are, in particular, manual mode and automatic mode. In manual mode, an operator selects a speed for one of the conveyor elements. In automatic mode, the flow rate is controlled in accordance with the target flow value and the actual flow value.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which they are achieved will become clearer and more plainly comprehensible in conjunction with the following description of the exemplary embodiment explained in more detail in conjunction with the drawings, in which, shown in schematic form.

DETAILED DESCRIPTION OF THE EXEMPLARY EMBODIMENTS

Figure 1:
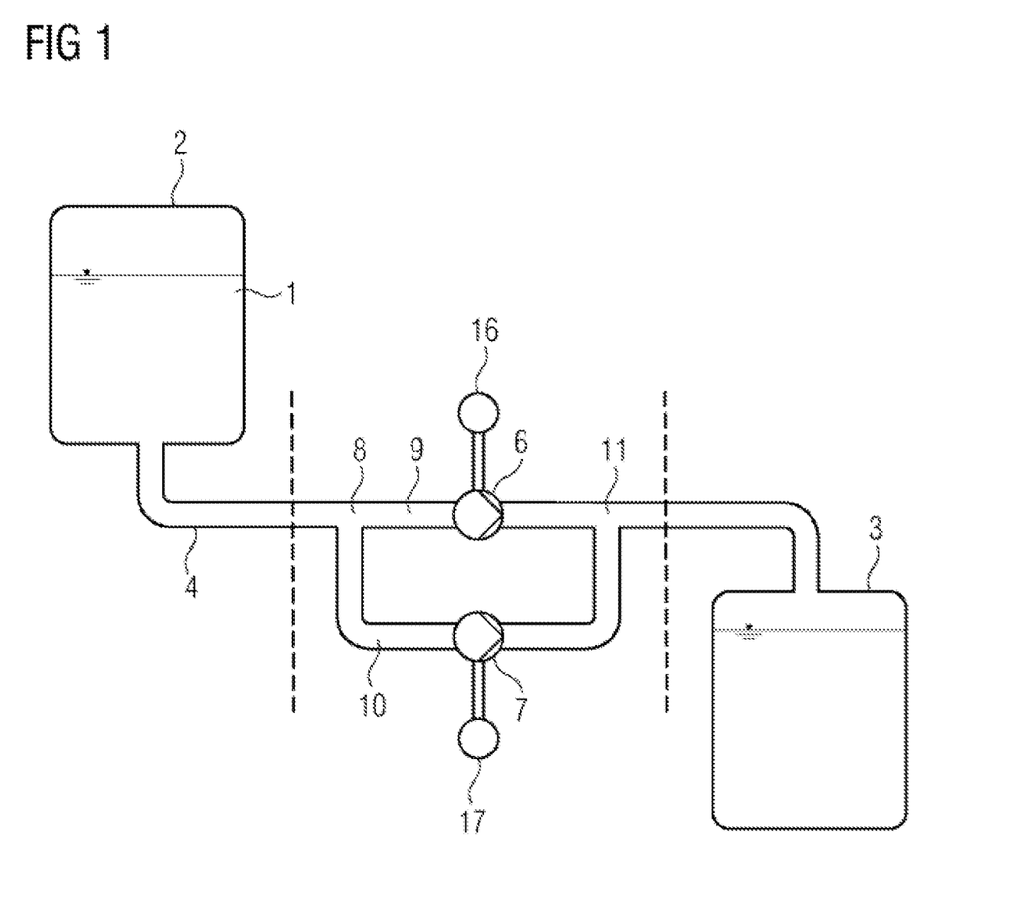
FIG. 1 shows part of an industrial plant.

According to FIG. 1, a medium 1 is to be conveyed from a source location 2 to a destination 3. The medium 1 is generally a liquid medium, such as water or oil. However, in individual cases, the medium 1 may also be a gaseous medium. The source location 2 can, for example, be a tank from which the medium 1 is taken. The destination 3 can, for example, be a reactor in which the medium 1 is mixed with at least one other medium or processed in some other way. However, other embodiments are also possible.

To convey the medium 1 from the source location 2 to the destination 3, a conveyor assembly has a conveyor line 4. The conveyor line 4 has a conveyor section 5 between the source location 2 and the destination 3. The conveyor section 5 is bounded by vertical dashed lines in FIG. 1 and depicted in more detail in FIG. 2.

Figure 2:
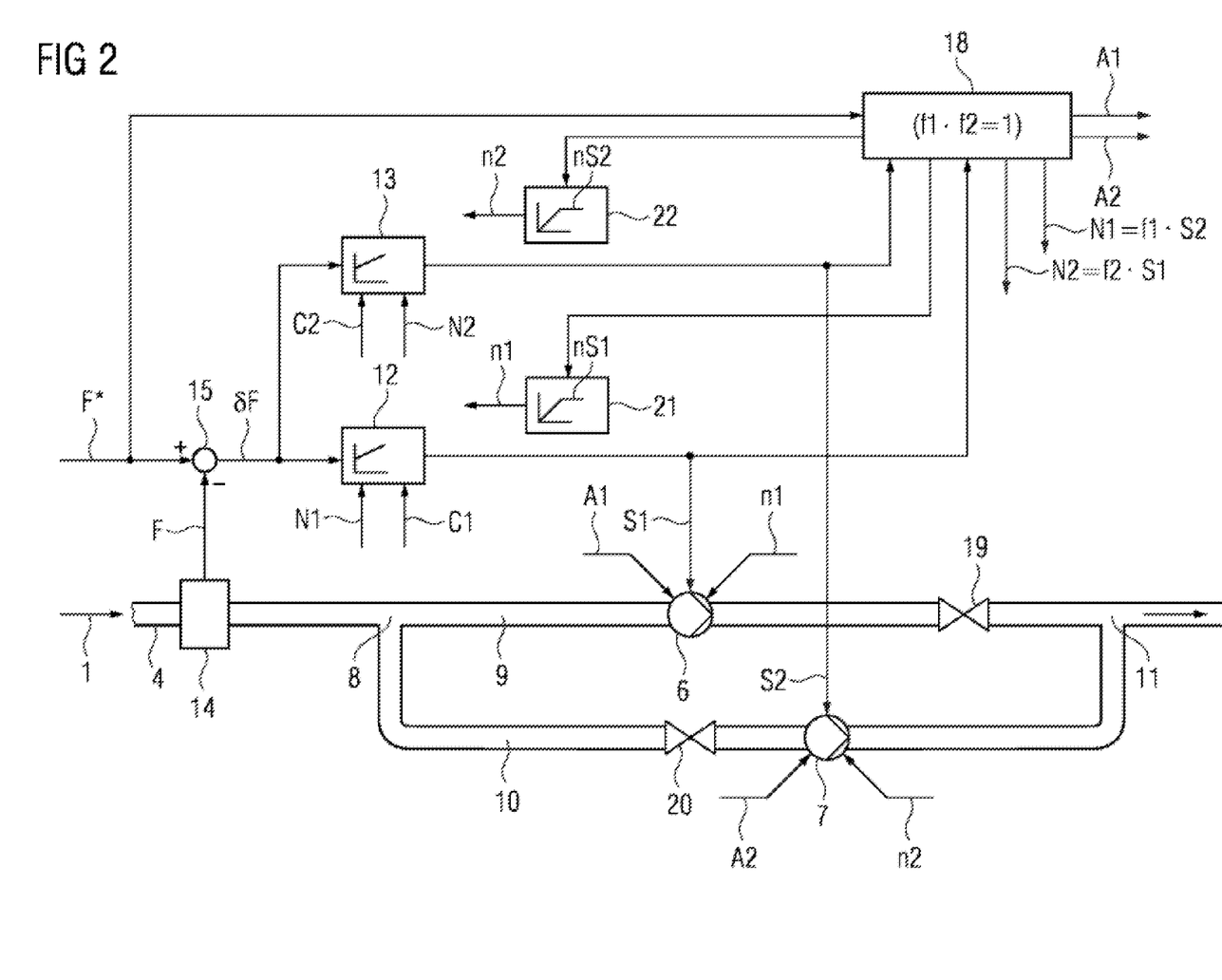
FIG. 2 shows a conveyor assembly in accordance with the invention.

With reference to FIGS. 1 and 2, two conveyor elements 6, 7 are arranged in the conveyor section 5. If the medium 1 is a liquid, then the conveyor elements 6, 7 are formed as pumps. In this case, the pumps are generally formed as centrifugal pumps. If the medium 1 is a gas, then the conveyor elements 6, 7 can, for example, be formed as compressors or blowers. In any case, however, the conveyor elements 6, 7 are dimensioned differently.

The conveyor elements 6, 7 are connected in parallel with one another. Therefore, the conveyor section 5 has a front nodal point 8 at which the conveyor line 4 forks into two branches 9, 10. One of the two conveyor elements 6, 7 is arranged in each of the two branches 9, 10. Furthermore, there is often a rear nodal point 11 at which the two branches 9, 10 reunite.

With reference to FIG. 2, the conveyor elements 6, 7 are controlled by a respective flow controller 12, 13. The two flow controllers 12, 13 are generally formed as proportional integral (PI) controllers or proportional integral (PID) controllers.

A target flow value F* is supplied to the flow controllers 12, 13. Furthermore, an actual flow value F is supplied to the flow controllers 12, 13. The actual flow value F can, for example, be detected via a flow sensor 14 arranged in the conveyor line 4; either upstream of the front nodal point 8 or (if present) downstream of the rear nodal point 11.

As evident, the same target flow value F* and the same actual flow value F are supplied to the flow controllers 12, 13. Therefore, the target flow value F* and the actual flow value F are uniform for both flow controllers 12, 13. Furthermore, the flow controllers 12, 13 can be preceded by a summation point 15 in which the control deviation δF is formed, i.e., the deviation between the target flow value F* and the actual flow value F. Here, the control deviation δF can be supplied to the flow controllers 12, 13. Alternatively, the control deviation δF can also be formed within the flow controllers 12, 13.

The two flow controllers 12, 13 operate in accordance with a respective control algorithm C1, C2. The two control algorithms C1, C2 determine, for example, whether the respective flow controller 12, 13 operates as a P controller, PI controller, PID controller etc., the size of the proportional gain, the reset time of the integral components etc. The two control algorithms C1, C2 are individually and independently tuned for optimal actuation of the respective conveyor element 6, 7. Each of the two flow controllers 12, 13 uses its control algorithm C1, C2 to ascertain a respective manipulated variable S1, S2 based on the target flow value F* and the actual flow value F (or the control deviation δF) for the conveyor element 6, 7 under its control. The respective manipulated variable S1, S2 can in particular be a respective target speed. The flow controllers 12, 13 control the respective conveyor element 6, 7 (more precisely: the drive 16, 17 (see FIG. 1) of the respective conveyor element 6, 7) according to their respective manipulated variable S1, S2. Therefore, the conveyor elements 6, 7 or the drives 16, 17 thereof can be speed controlled. The drives 16, 17 can in particular be formed as electric drives. Here, the drives 16, 17 can, for example, be fed via a respective converter (not depicted in the FIGS.).

Only one of the two conveyor elements 6, 7 is active at a time. The conveyor assembly has a changeover device 18 for activating and deactivating the conveyor elements 6, 7. In particular, the target flow value F* is supplied to the changeover device 18. The changeover device 18 is configured in such that, depending on the value of the target flow value F*, it releases the actuation of one of the conveyor elements 6, 7 by the corresponding flow controller 12, 13 and suppresses the actuation of the other one of the two conveyor elements 7, 6 by the corresponding flow controller 13, 12. This is explained in more detail below with additional reference to FIGS. 3 and 4. The release and the suppression of the actuation of the conveyor elements 6, 7 (or the drives 16, 17 thereof) can, for example, be effected because the changeover device 18 outputs a respective activation signal A1, A2 to the two conveyor elements 6, 7. In this regard, at any given time, the corresponding activation signal A1, A2 is output to only one of the two conveyor elements 6, 7. When the respective activation signal A1, A2 is switched off, the respective conveyor element 6, 7 is switched off completely.

Figure 3:
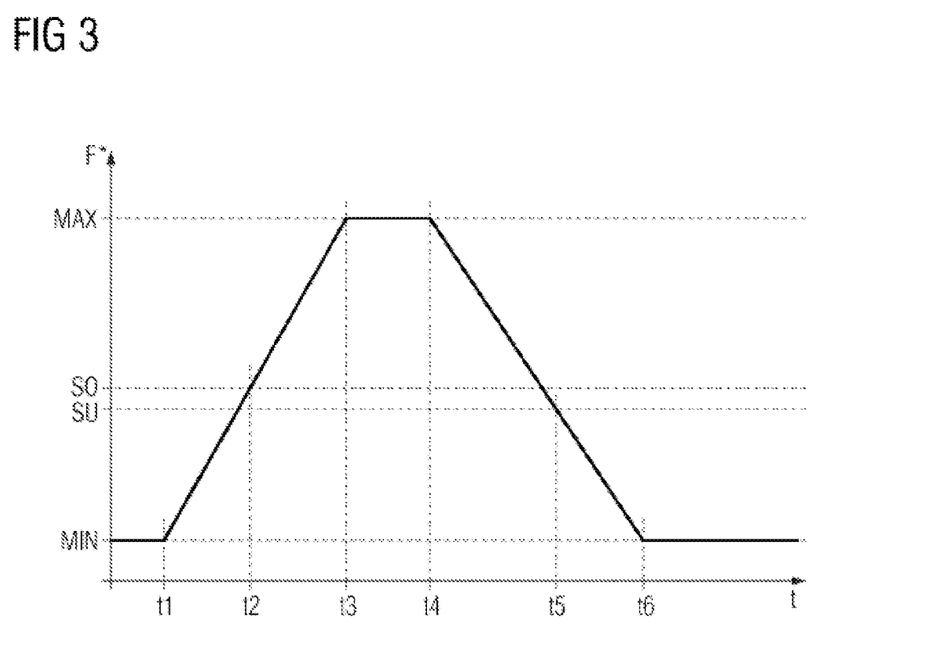
FIGS. 3 to 5 show graphical plots of time diagrams.

With reference to FIG. 3, the target flow value F* has a minimum value MIN at a time point t1. After the time point t1, the target flow value F* gradually increases as a function of time t to a maximum value MAX. Specifically, the target flow value F* reaches an upper changeover threshold SO at a time point t2, and the maximum value MAX at a time point t3. From a time-point t4, the target flow value F* again falls to the minimum value MIN. Specifically, the target flow value F* reaches a lower changeover threshold SU at a time point t5 and the minimum value MIN at a time point t6.

Figure 4:
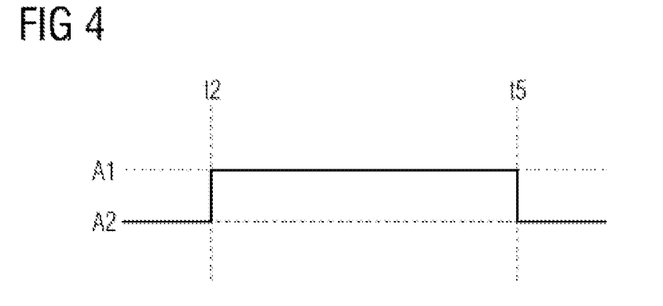

In accordance with the depiction in FIG. 4, the activation signal A2 is output at the time point t1 so that the conveyor element 7 is actuated in accordance with the control signal S2 ascertained by the flow controller 13. Correspondingly, the activation signal A1 is not output.

This state is maintained until the target flow value F* reaches the upper changeover threshold SO at the time point t2. When the upper changeover threshold SO is exceeded, the activation signal A2 is changed to the activation signal A1. This ensures that the conveyor element 6 is now actuated by the flow controller 12 in accordance with the control signal S1 ascertained thereby and the conveyor element 7 is no longer actuated by the flow controller 13.

This state is maintained until the target flow value F* reaches the lower changeover threshold SU at the time point t5. When the lower changeover threshold SU is fallen below, a change is effected from the activation signal A1 back to the activation signal A2.

The result is that the medium 1 flows solely via the conveyor element 6, 7 to which the corresponding activation signal A1, A2 is supplied. In particular, the medium 1 thus flows solely via the conveyor element 6 as long as the target flow value F* remains above the upper changeover threshold SO and below the maximum value MAX. Likewise, the medium 1 flows solely via the conveyor element 7 as long as the target flow value F* remains below the lower changeover threshold SU and above the minimum value MIN.

To completely suppress any flow of the medium 1 via the non-actuated conveyor element 6, 7, a blocking element 19, 20, such as a corresponding valve, can be arranged in each of the two branches 9, 10. Here, the respective blocking element 19, 20 is kept permanently fully open by the changeover device 18 as long as the conveyor element 6, 7 arranged in the same branch 9, 10 is supplied with its activation signal A1, A2. If the respective conveyor element 6, 7 is not supplied with its respective activation signal A1, A2, then the respective blocking element 19, 20 is closed.

To enable the smoothest possible changeover from the one conveyor element 6 to the other conveyor element 7 and vice versa, a tracking value N1 is supplied to the flow controller 12 whenever the conveyor element 6 it controls is not actuated. Analogously, whenever the conveyor element 7 it controls is not actuated, the flow controller 13 is supplied with a tracking value N2. The tracking values N1, N2 determine the value for the integral component with which the respective flow controller 12, 13 is initialized at the time point at which it is activated (i.e., the output of the manipulated variable S1, S2 ascertained thereby to the corresponding conveyor element 6, 7 is released). In the example in accordance with FIGS. 3 and 4, this is the time point t2 for the flow controller 12. For the flow controller 13, this is the time point t5. In particular, the integral component of the respective flow controller 12, 13 is ascertained such that the manipulated variable S1, S2 of the respective flow controller 12, 13 is equal to the respective tracking value N1, N2 at the time point t2 or t5 of the changeover.

Returning to FIG. 2, the tracking values N1, N2 are ascertained by the changeover device 18. However, they could also be ascertained by another device. The tracking values N1, N2 are ascertained because the respective tracking value N1 or N2 is obtained by multiplying the manipulated variable S2 or S1 of the respective other flow controller 13, 12 by a respective predetermined factor f1, f2. Therefore: $N1=f1*S2$ and $N2=f2*S1$. Furthermore, when ascertaining the tracking values N1 or N2, manipulated variable limitations of the flow controllers 12, 13 are taken into account. The two factors f1, f2 are reciprocal to one another. Therefore: $f1*f2=1$ or $f2=1/f1$.

The two factors f1, f2 can be determined as required. However, the determination is preferably made based on the nominal flow rates of the corresponding conveyor elements 6, 7. If the nominal flow rate of the conveyor element 6 is designated FN1 and the nominal flow rate of the conveyor element 7 FN2, then preferably $f1=FN2/FN1$ and consequently, vice versa, $f2=FN1/FN2$.

After the changeover of the conveyor elements 6, 7, the newly activated conveyor element 6, 7 requires a certain time until it has reached the desired speed (as defined by the respective manipulated variable S1, S2 or the corresponding tracking value N1, N2). The newly activated conveyor element 6, 7 is ramped up against resistance. Accordingly, the conveyor element 6 can become overloaded if the speed actually desired is approached too quickly. For this reason, a respective ramp generator 21, 22 is assigned to the conveyor elements 6, 7 in accordance with the depiction in FIG. 2. If, for example, the conveyor elements 6, 7 are driven via converter-fed drives, then the ramp generators 21, 22 can be arranged in the converters. Calculated from the activation of the respective conveyor element 6, 7, the respective ramp generators 21, 22 ramp up a speed of the respective conveyor element 6, 7 in accordance with a predetermined respective ramp. The ramping up occurs up to a speed limit. The speed limit can, for example, be determined by the tracking value N1, N2 at the time point of the activation of the corresponding conveyor element 6, 7. After passing through the respective ramp, the respective ramp generator 21, 22 is switched to inactive again. From this time point on, the respective conveyor element 6, 7 is normally actuated by the respective flow controller 12, 13. This is explained in more detail below in connection with FIG. 5 for the conveyor element 6 and the flow controller 12 thereof.

Figure 5:
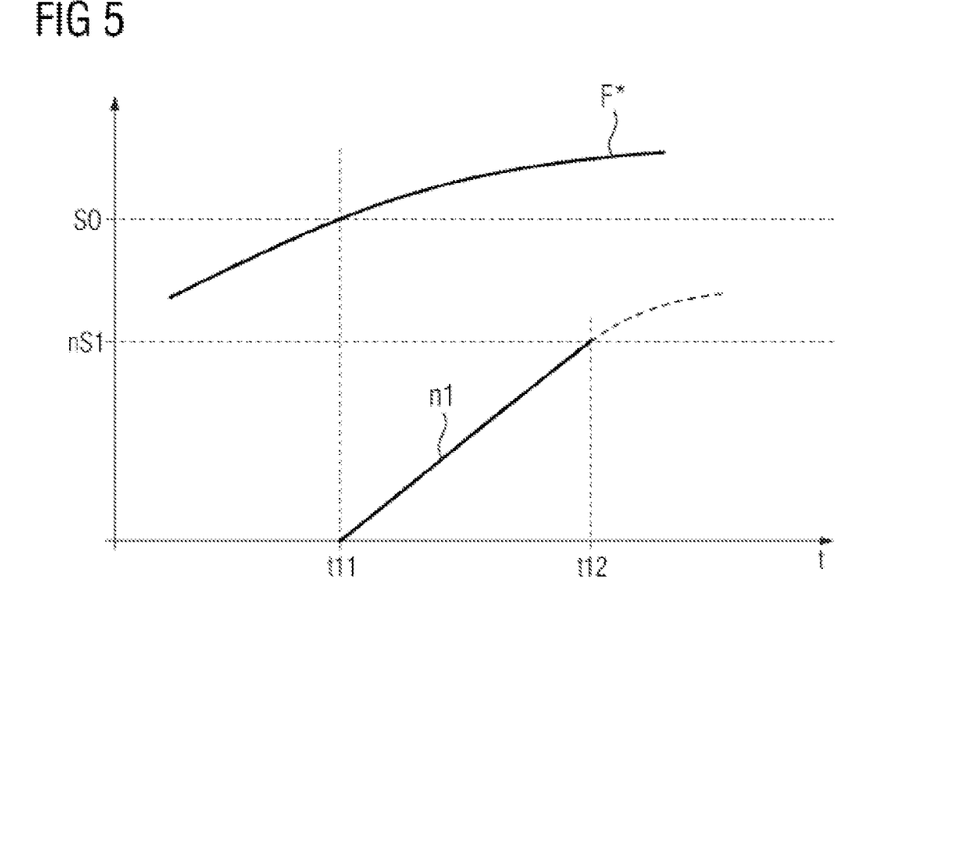

FIG. 5 shows an exemplary graphical plot of a possible time profile of the target flow value F*. With reference to FIG. 5, over the course of time t, the target flow value F* exceeds the upper threshold SO at a time point t11. At time point t11, there is a changeover from the conveyor element 7 to the conveyor element 6. Thus, from time point t11, in particular the actuation of the conveyor element 7 is suppressed and the conveyor element 6 is actuated instead. In a stable state, the upper threshold SO corresponds to a specific speed nS1. Starting at the time point t11, the ramp generator 21 outputs a target speed n1 corresponding to its ramp. With reference to the depiction in FIG. 5, the target speed n1 rises from the time point t11 linearly until the end of the ramp is reached at a time point t12. Only at this time point is the output of the "normal" manipulated variable S1 to the conveyor element 6 released.

Analogous statements are applicable for the conveyor element 7 and the flow controller 13 thereof, i.e., for the inverse changeover. However, the duration of the ramp up and the specific speed nS2 for the target speed n2 in accordance with the ramp of the ramp generator 22 can differ from the corresponding values of the ramp generator 21.

The implementation of the conveyor assembly, i.e., the two flow controllers 12, 13, in a more comprehensive process control system via control technology is easily possible. It is in particular possible in the context of the process control system to interconnect the two controller entities via which the flow controllers 12, 13 are realized internally so that they are always supplied with the same target flow value F* and always supplied with the same actual flow value F or always supplied with the same control deviation δF.

Furthermore, it is also easy to couple the two flow controllers 12, 13 to one another in the process control system so that they not only always receive the same target flow value F* and the same actual flow value F, but are also always operated in the same operating mode (i.e., automatic mode or manual mode). In the context of an operating and monitoring system, it is furthermore possible for the conveyor section 5 to only depict a single flow controller that (apparently) only controls one single conveyor element. This is generally the flow controller 12, 13 for the conveyor element 6, 7 with the higher nominal flow rate. However, it is equally possible to depict the conveyor section 5 as it is (i.e., with the two branches 9, 10 and the conveyor elements 6, 7 arranged therein). However, in this case generally only one single flow controller is depicted for both conveyor elements 6, 7. Alternatively, the latter depiction can be permanent or, for example in the case of a malfunction of one of the two conveyor elements 6, 7, it can be output instead of the first depiction mentioned.

It is also easily possible to extend the conveyor assembly to three, four, etc., conveyor elements connected in parallel. This is briefly outlined below for an extension to three conveyor elements.

Figure 6:
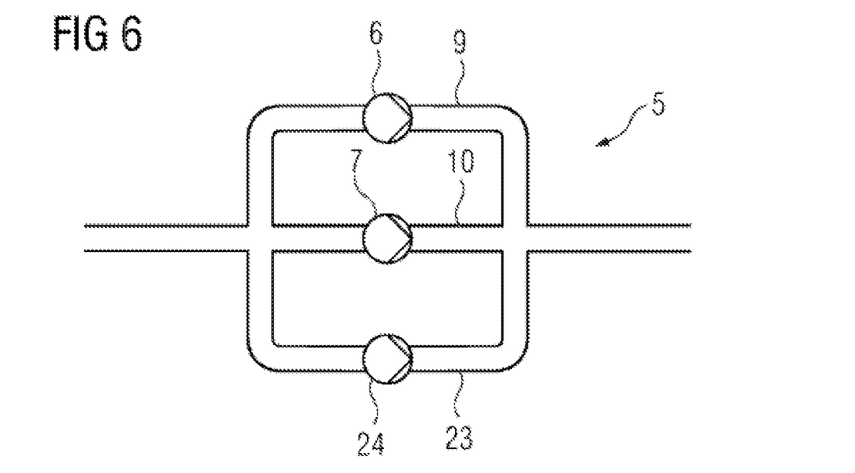
FIG. 6 shows a further conveyor assembly in accordance with an embodiment of the invention.

Therefore, let it be assumed that, in accordance with the depiction in FIG. 6, a configuration of a conveyor assembly in which, in addition to the branches 9, 10 with the conveyor elements 6, 7, the conveyor section 5 has a further branch 23 in which a further conveyor element 24 is arranged. Without restricting generality, it can be assumed that the conveyor element 7 is the conveyor element with the lower nominal flow rate and that the further conveyor element 24 has a nominal flow rate which is lower than the nominal flow rate of the smaller conveyor element 7. Here, the changeover between the conveyor elements 6, 7, as explained above with respect to FIGS. 3 to 5, can be maintained unchanged. A further changeover between the smaller conveyor element 7 and the further conveyor element 24 can occur completely analogously to the explanations for FIGS. 3 to 5. However, as far as the interaction between the conveyor element 7 and the further conveyor element 24 is concerned, the following substitutions must be made:

The maximum value for the interaction between the conveyor element 7 and the further conveyor element 24 is equal to the upper or lower changeover threshold SO, SU for the interaction of the conveyor elements 6 and 7.

The upper or lower changeover threshold for the interaction between the conveyor element 7 and the further conveyor element 24 is equal to the minimum value MIN.

The minimum value for the further conveyor element 24 should be selected as (sufficiently) low.

In a completely analogous manner, it is also possible for further extensions to be made in order to include even more conveyor elements.

Thus, in summary, the present invention relates to the following subject matter:

A medium 1 is conveyed from a source location 2 to a destination 3 via a conveyor line 4. The conveyor line 4 includes a conveyor section 5 arranged between the source location 2 and the destination 3 in which two conveyor elements 6, 7 are arranged. The conveyor elements 6, 7 are connected in parallel with one another and are controlled by a respective flow controller 12, 13. The two flow controllers 12, 13 are supplied with the same target flow value F* and the same actual flow value F. From these, the two flow controllers 12, 13 ascertain a respective manipulated variable S1, S2 for the respective conveyor element 6, 7. A changeover device 18 of the conveyor assembly is embodied such that, if the target flow value F* falls below a lower changeover threshold SU, then the changeover device 18 suppresses the actuation of the one conveyor element 6 by the one flow controller 12 and releases the actuation of the other conveyor element 7 by the other flow controller 13, so that the medium 1 flows solely via the other conveyor element 7 as long as the target flow value F* remains above a minimum value MIN and below a upper changeover threshold SO. Analogously, if the target flow value F* exceeds the upper changeover threshold SO, then the actuation of the other conveyor element 7 by the other flow controller 13 is suppressed and the actuation of the one conveyor element 6 by the one flow controller 12 is released, so that the medium 1 flows solely via the one conveyor element 6 as long as the target flow value F* remains below a maximum value MAX and above the lower changeover threshold SU.

The present invention has the following advantages: the actual flow rate F of the medium 1 can be precisely controlled in an energy-efficient manner. The use of separate flow controllers 12, 13 achieves a good control quality. Tracking the respective inactive flow controller 12, 13 enables an integrator windup of the flow controllers 12, 13 to be avoided and an at least almost smooth transition to be achieved on changing the conveyor elements 6, 7. On the other hand, there are virtually no changes for the operator of the system.

Although the invention was illustrated and described in more detail by the preferred exemplary embodiment, the invention is not restricted by the disclosed examples and other variations can be derived herefrom by the person skilled in the art without departing from the scope of protection of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements that perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A conveyor assembly for a medium, comprising:
   a conveyor line via which the medium is conveyed from a source location to a destination, the conveyor line including:
   a conveyor section arranged between the source location and the destination, a first and second conveyor element arranged in the conveyor section, the first and second conveyor elements being connected in parallel with one another and being controlled by a a first and second flow controller respectively; and
   two blocking elements, one blocking element being arranged downstream in series with the first conveyor element of the two conveyor elements and another blocking element being arranged upstream in series with the second conveyor element;
   wherein a target flow value which is uniform for each of the first and second flow controllers and an actual flow value which is uniform for the first and second flow controllers is supplied to the first and second flow controllers respectively;
   wherein the first and second flow controllers calculate a respective manipulated variable for the first and second conveyor elements respectively based on the target flow value and the actual flow value utilizing a respective control algorithm;
   wherein the conveyor assembly comprises a further controller to which the target flow value is supplied;
   wherein the further controller, when the target flow value falls below a lower changeover threshold, suppresses actuation of the first conveyor element of the two conveyor elements by the first flow controller and releases actuation of the second conveyor element of two conveyor elements by the second flow controller such that the medium flows solely via the second conveyor element as long as the target flow value remains above a minimum value and below an upper changeover threshold;
   wherein the further controller, when the target flow value exceeds the upper changeover threshold, suppresses the actuation of the second conveyor element by the the second flow controller and releases the actuation of the first conveyor element by the the first flow controller, such that the medium flows solely via the one conveyor element as long as the target flow value remains below a maximum value and above the lower changeover threshold;
   wherein a tracking value is supplied to the first or second flow controllers for which actuation of an associated conveyor element of the conveyor elements is suppressed;
   wherein the tracking value is obtained by multiplying the manipulated variable of the first or second flow controllers which actuates its conveyor element by a respective predetermined factor;
   wherein each of the first and second controllers is assigned a respective ramp generator for calculating a predetermined ramp up rate;

wherein the respective ramp generator controls the ramp up speed of the first or second controllers which actuates its conveyor element; and wherein the respective ramp generator determines a ramp up speed limit from the supplied tracking value.

2. The conveyor assembly as claimed in claim 1, wherein the first and second flow controllers are inter-coupled so as to always receive the same target flow value and the same actual flow value and so as to always operate in the same operating mode.

3. The conveyor assembly as claimed in claim 1, wherein the first and second flow controllers are inter-coupled so as to always receive the same target flow value and the same actual flow value and so as to always operate in the same operating mode.

* * * * *